United States Patent
Furuhata et al.

(10) Patent No.: US 9,240,662 B2
(45) Date of Patent: Jan. 19, 2016

(54) TERMINAL TREATMENT METHOD AND TERMINAL TREATMENT APPARATUS FOR COAXIAL CABLE

(71) Applicant: Yazaki Corporation, Tokyo (JP)

(72) Inventors: Kenta Furuhata, Makinohara (JP); Yasutsugu Shiraki, Makinohara (JP)

(73) Assignee: Yazaki Corporation, Tokyo (JP)

(*) Notice: Subject to any disclaimer, the term of this patent is extended or adjusted under 35 U.S.C. 154(b) by 330 days.

(21) Appl. No.: 13/870,047

(22) Filed: Apr. 25, 2013

(65) Prior Publication Data

US 2013/0283612 A1    Oct. 31, 2013

(30) Foreign Application Priority Data

Apr. 27, 2012   (JP) ................................. 2012-104016

(51) Int. Cl.
| | |
|---|---|
| *H01R 43/04* | (2006.01) |
| *H01R 43/20* | (2006.01) |
| *H01R 43/28* | (2006.01) |
| *H02G 1/12* | (2006.01) |
| *H02G 1/00* | (2006.01) |

(52) U.S. Cl.
CPC ............... *H01R 43/20* (2013.01); *H01R 43/28* (2013.01); *H02G 1/005* (2013.01); *H02G 1/1292* (2013.01); *Y10T 29/49218* (2015.01); *Y10T 29/53235* (2015.01)

(58) Field of Classification Search
CPC ................... Y10T 29/49218; Y10T 29/53235; Y10T 29/49208; Y10T 29/49204; Y10T 29/49117; Y10T 29/49002; Y10T 29/49123; Y10T 29/49174; H02G 1/005; H02G 1/1292; H01R 43/20; H01R 43/28
USPC ........ 29/882, 876, 874, 825, 592.1, 828, 867, 29/863, 861, 857
See application file for complete search history.

(56) References Cited

U.S. PATENT DOCUMENTS

| | | | |
|---|---|---|---|
| 5,867,896 A | 2/1999 | Watanabe | |
| 6,883,232 B2 * | 4/2005 | Sato et al. ............ | H01R 43/048 29/33 F |
| 2004/0099427 A1 | 5/2004 | Kihira | |
| 2006/0264099 A1 | 11/2006 | Morikawa | |

FOREIGN PATENT DOCUMENTS

| | | | |
|---|---|---|---|
| CN | 1851987 A | 10/2006 | |
| DE | 4212805 C1 * | 9/1993 | ............ H01R 43/28 |

(Continued)

OTHER PUBLICATIONS

Office Action dated Feb. 2, 2015 issued by the State Intellectual Property Office of the People's Republic of China in counterpart Chinese Application No. 201310150329.1.

*Primary Examiner* — Peter DungBa Vo
*Assistant Examiner* — Azm Parvez
(74) *Attorney, Agent, or Firm* — Sughrue Mion, PLLC

(57) ABSTRACT

A terminal treatment method is for a coaxial cable which includes a core member in which an inner conductor is covered with an insulator, an outer conductor provided around the core member and formed of a plurality of wires, and a sheath covering an outer circumference of the outer conductor. The method includes exposing the outer conductor by removing the sheath on an end portion of the coaxial cable, separating the wires of the outer conductor from an outer circumferential surface of the core member by gripping and moving an end portion of the outer conductor to loosen the exposed portion of the outer conductor, extruding the core member having the inner conductor from gaps formed in the wires of the outer conductor to extract the core member from the outer conductor, and intertwining the outer conductor by gripping and twisting the end portion of the outer conductor.

1 Claim, 13 Drawing Sheets

(56) References Cited

FOREIGN PATENT DOCUMENTS

| | | |
|---|---|---|
| JP | 6481608 A | 3/1989 |
| JP | 4-261317 A | 9/1992 |
| JP | 2004171952 A | 6/2004 |
| JP | 200766825 A | 3/2007 |

* cited by examiner

FIG. 25A
PRIOR ART
FIG. 25B
PRIOR ART
FIG. 25C
PRIOR ART
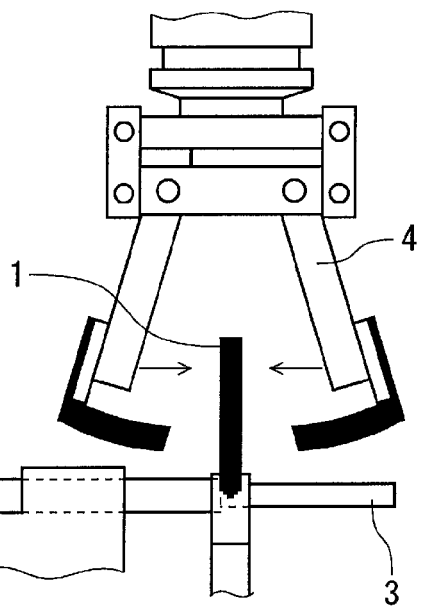
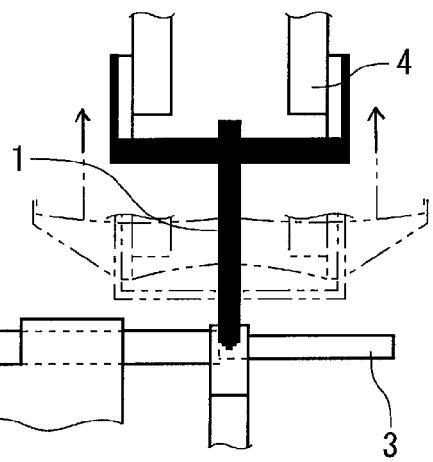
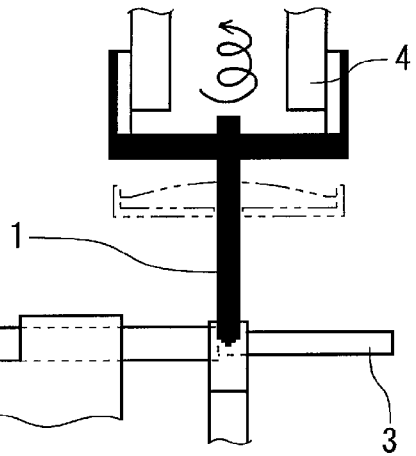

TERMINAL TREATMENT METHOD AND TERMINAL TREATMENT APPARATUS FOR COAXIAL CABLE

CROSS REFERENCE TO RELATED APPLICATION

This application is based on Japanese Patent Applications No. 2012-104016 filed on Apr. 27, 2012, the contents of which are incorporated herein by reference.

BACKGROUND OF THE INVENTION

1. Technical Field

The present invention relates to a terminal treatment method and a terminal treatment apparatus of a coaxial cable having an inner conductor and an outer conductor.

2. Background Art

As electric cables having a shielding function, coaxial cables covering an outer peripheral of an inner conductor have been used from the past (for example, see JP-A-2004-171952 and JP-A-2007-66825).

Also, a technique for terminal-treating such coaxial cables, in which an inner conductor in a terminal portion thereof is separated from an outer conductor, has been known (for example, see JP-A-H1-081608). According to this terminal treatment, an outer conductor 1 formed of fine wires is untwisted as shown in FIG. 23 and then the outer conductor 1 is separated from a center conductor 3 by air from an air knife 2 as shown in FIG. 24. Next, the separated outer conductor 1 becomes upright and a bundle of fine wires of the outer conductor 1 is sandwiched and then stretched and twisted by a gripping tool 4 as shown in FIGS. 25A to 25C.

However, there is a case that a coaxial cable, in which an outer conductor disposed on an outer circumference of an inner conductor is intended to be used as a lead like the inner conductor, not as a shielding use, is employed for a wire harness wired in a vehicle, such as an automobile. In a case of such a coaxial cable, the inner conductor in a terminal thereof is separated from the outer conductor and then each of the inner conductor and the outer conductor is connected to a respective connector.

In the coaxial cable used as this application, because the outer conductor does not have a small diameter as in the shielding use, when the outer conductor is untwisted, a sheath and the outer conductor of the coaxial cable chucked are slipped relative to each other, thereby causing insufficient untwisting.

Further, in a case of an outer conductor having a large wire diameter, it is difficult to separate the outer conductor by air of the air knife. In addition, when the separated outer conductor is bundled, if a bundle of wires of the outer conductor is sandwiched and then stretched and twisted, the outer conductor can be damaged or broken and thus deterioration of electrical and mechanical properties is worried.

Accordingly, the present invention has been made keeping in mind the above problems, and an object of the invention is to provide a terminal treatment method and a terminal treatment apparatus for a coaxial cable, in which an outer conductor and an inner conductor can be easily branched from each other.

SUMMARY OF THE INVENTION

To achieve the above object, a terminal treatment method of a coaxial cable according to the present invention is characterized by the following (1) to (6).

(1) A terminal treatment method is for a coaxial cable which includes a core member in which an inner conductor is covered with an insulator, an outer conductor provided around the core member and formed of a plurality of wires, and a sheath covering an outer peripheral of the outer conductor. The terminal treatment method is for branching the core member and the outer conductor from each other at a terminal of the coaxial cable in which both the outer conductor and the inner conductor are used as leads. The method includes exposing the outer conductor by removing the sheath on an end portion of the coaxial cable, separating the wires of the outer conductor from an outer circumferential surface of the core member by gripping and moving an end portion of the outer conductor to loosen the exposed portion of the outer conductor, extruding the core member having the inner conductor from gaps formed in the wires of the outer conductor to extract the core member from the outer conductor, and intertwining the outer conductor by gripping and twisting the end portion of the outer conductor after the extruding step.

(2) The terminal treatment method for the coaxial cable according to (1) further includes a step for mounting a cylindrical core onto the core member at a terminal of the outer conductor exposed by the outer conductor exposing step before the separating step.

(3) The terminal treatment method for the coaxial cable according to (1) or (2) further includes a step for widening the terminal of the outer conductor away from the core member by deforming a terminal-near portion of the outer conductor exposed in the outer conductor exposing step by compression from an outer circumferential side of the core conductor before the cylindrical core mounting step.

(4) The terminal treatment method of the coaxial cable according to any one of (1) to (3), wherein before the outer conductor intertwining step, an outer conductor converging step of converging the outer conductor, which has been loosened by extracting the core member therefrom in the inner conductor extracting step, by pressing from an outer circumference thereof is performed.

(5) The terminal treatment method of the coaxial cable according to any one of (1) to (4), wherein before the outer conductor releasing step, a core mounting step of mounting a cylindrical core onto the core member in a terminal of the outer conductor exposed in the outer conductor exposing step is performed.

(6) The terminal treatment method of the coaxial cable according to (5), wherein before the core mounting step, an outer conductor terminal widening step of widening the terminal of the outer conductor away from the core member by deforming a terminal-near portion of the outer conductor exposed in the outer conductor exposing step by compression from an outer circumferential side thereof is performed.

According to the terminal treatment method of the coaxial cable of (1), the end portion of the outer conductor is directly gripped and moved. Thus, slipping of the outer conductor relative to the sheath is reduced so that the exposed portion of the outer conductor can be easily loosened, thereby clearly separating the wires of the outer conductor from an outer circumferential surface of the core member.

Namely, even when the coaxial cable is intended to be used as a wire harness for a vehicle, in which the outer conductor includes wires of a large diameter, rather than a small diameter as in a shielding use, the outer conductor is clearly separated from the core member without damaging or breaking the wires. Therefore, stabilization of a product shape can be achieved, thereby ensuring good electrical and mechanical properties. In addition, mechanization of terminal treatment is easy, thereby reducing the processing effort.

Also, by separating the wires of the outer conductor from the core member as described above, extruding and extracting the core member having the inner conductor from the outer conductor, and then intertwining the outer conductor, the inner conductor of the core member and the outer conductor can be clearly branched from each other to enable connection to a connector or the like.

Further, because the core member having the inner conductor is extruded to be branched from the outer conductor, a fixation position of the coaxial cable and a terminal position of the outer conductor are not changed. As a result, the outer conductor releasing step and the outer conductor intertwining step can be performed using the same equipments, thereby achieving reduction of equipment costs.

According to the terminal treatment method of the coaxial cable of (2), when the coaxial cable has the outer conductor wound on the core member in a spiral pattern, the outer conductor is gripped at the end portion thereof and is rotated in a direction opposite to a twisting direction thereof to be untwisted. Therefore, the outer conductor can be very easily loosened to be separated from the core member.

According to the terminal treatment method of the coaxial cable of (3), before the core member having the inner conductor is extracted, the outer conductor is split into a plurality of groups of wires to form the gaps during the outer conductor splitting step, thereby achieving easy branching from the core member.

According to the terminal treatment method of the coaxial cable of (4), before the outer conductor is intertwined, the loosened outer conductor is pressed from an outer circumference thereof to be converged, thereby achieving easy and smooth intertwining of the outer conductor during the outer conductor intertwining step.

According to the terminal treatment method of the coaxial cable of (5), the cylindrical core is mounted onto the core member in the terminal of the outer conductor so that the outer conductor is sandwiched between the outer circumferential surface of the core and a chuck jig during the outer conductor releasing step, thereby eliminating the pressing or torsion load which would otherwise been acted to the inner conductor of the core member. As a result, deterioration of mechanical properties, such as tensile or elongation, of the inner conductor of the core member can be prevented, thereby maintaining a good quality.

According to the terminal treatment method of the coaxial cable of (6), prior to mounting the core, a terminal-near portion of the outer conductor is deformed by compression from the outer circumferential side thereof so that the terminal portion of the outer conductor can be widened away from the core member, thereby achieving enhancement of workability due to easy mounting of the core.

Also, to achieve the above object, a terminal treatment apparatus of a coaxial cable according to the present invention is characterized by the following (7) to (10).

(7) A terminal treatment apparatus is for a coaxial cable which includes a core member in which an inner conductor is covered with an insulator, an outer conductor provided around the core member and formed of a plurality of wires, and a sheath covering an outer circumference of the outer conductor. The terminal treatment apparatus is for branching the core member and the outer conductor from each other at a terminal of the coaxial cable in which both the outer conductor and the inner conductor are used as leads. The terminal treatment apparatus includes a gripping jig that grips an end portion of the sheath of the coaxial cable having the outer conductor exposed by removing the sheath on an end portion of the coaxial cable, a chuck jig that moves in an axial direction of the coaxial cable or rotate about an axis of the coaxial cable after gripping an end portion of the exposed outer conductor of the coaxial cable gripped by the gripping jig, and an extruding jig that laterally extrudes the core member having the inner conductor from gaps formed in the wires of the outer conductor to extract the core member from the outer conductor.

(8) The terminal treatment apparatus of the coaxial cable according to (7), further comprising a splitting jig for splitting the exposed and loosened outer conductor into a plurality of groups of wires to form the gaps.

(9) The terminal treatment apparatus of the coaxial cable according to (7) or (8) further comprising a converging jig for converging the exposed and loosened outer conductor by pressing from an outer circumference thereof.

(10) The terminal treatment apparatus of the coaxial cable according to any one of (7) to (9) further comprising a terminal widening jig for widening a terminal of the outer conductor away from the core member by deforming a terminal-near portion of the exposed outer conductor by compression from an outer circumferential side thereof.

According to the terminal treatment apparatus of the coaxial cable of (7), after the sheath has been gripped by the gripping jig, the end portion of the outer conductor is directly gripped and moved by the chuck jig. Thus, slipping of the outer conductor relative to the sheath is reduced so that the exposed portion of the outer conductor can be easily loosened, thereby clearly separating the wires of the outer conductor from an outer circumferential surface of the core member.

Namely, even when the coaxial cable is intended to be used as a wire harness for a vehicle, in which the outer conductor includes wires of a large diameter, rather than a small diameter such as in a shielding use, the outer conductor is clearly separated from the core member without damaging or breaking the wires. Therefore, stabilization of a product shape can be achieved, thereby ensuring good electrical and mechanical properties. In addition, mechanization of terminal treatment is easy, thereby reducing the processing effort.

Also, by separating the wires of the outer conductor from the core member as described above, extruding and extracting the core member having the inner conductor from the outer conductor by the extruding jig, and then intertwining the outer conductor by rotation of the chuck jig, the inner conductor of the core member and the outer conductor can be clearly branched from each other to enable connection to a connector or the like.

Further, because the core member having the inner conductor is extruded by the extruding jig to be branched from the outer conductor, a fixation position of the coaxial cable and a terminal position of the outer conductor are not changed. As a result, an outer conductor releasing step and an outer conductor intertwining step can be performed using the same equipments, i.e., the gripping jig and the chuck jig, thereby achieving reduction of equipment costs.

In addition, the end portion of the outer conductor is gripped and then rotated by the chuck jig, thereby allowing easy intertwining of the outer conductor.

According to the terminal treatment apparatus of the coaxial cable of (8), before the core member having the inner conductor is extracted, the outer conductor is split into a plurality of groups of wires by the splitting jig to form the gaps, thereby achieving easy branching from the core member.

According to the terminal treatment apparatus of the coaxial cable of (9), before the outer conductor is intertwined, the loosened outer conductor is pressed from an outer circumference thereof by the converging jig to be converged, thereby achieving easy and smooth intertwining of the outer conductor.

According to the terminal treatment apparatus of the coaxial cable of (10), a terminal-near portion of the outer conductor is deformed by compression from the outer circumferential side thereof by the terminal widening jig so that the terminal portion of the outer conductor can be widened away from the core member. Thus, the cylindrical core, which provides a protection when the outer conductor is gripped by the chuck jig, can be easily mounted onto the core member, thereby achieving enhancement of workability.

According to the present invention, a terminal treatment method and a terminal treatment apparatus of a coaxial cable, in which an outer conductor and an inner conductor can be easily branched from each other, can be provided.

In the foregoing, the present invention has been briefly described. Also, details of the present invention will be further apparent, when modes (hereinafter, referred to as "embodiments") for embodying the invention as described below are thoroughly read with reference to the accompanying drawings.

BRIEF DESCRIPTION OF DRAWINGS

FIGS. 1A and 1B are views showing a coaxial cable of which a terminal is to be treated by a terminal treatment method and a terminal treatment apparatus for a coaxial cable according to the present invention, in which FIG. 1A is a perspective view of an end portion thereof and FIG. 1B is a sectional view of the end portion.

FIGS. 25A to 25C are views explaining terminal treatment according the related art, in which FIG. 25A to 25C are respectively side views of the end portion of the coaxial cable.

DESCRIPTION OF EMBODIMENTS

Exemplary embodiments according to the present invention will be now described with reference to the accompanying drawings.

<First Embodiment>

Firstly, a terminal treatment method and a terminal treatment apparatus according to a first embodiment will be described.

Figure 1A:
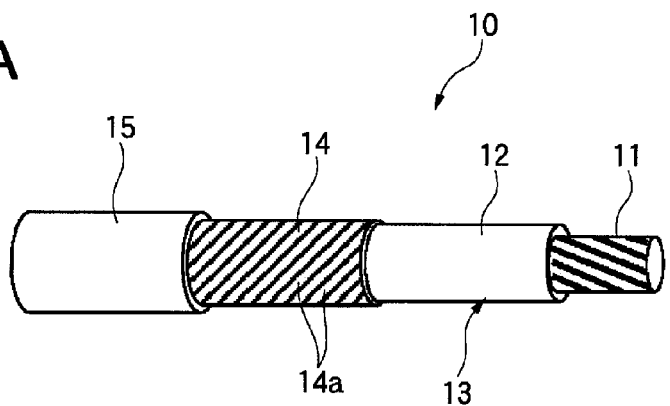
Figure 1B:
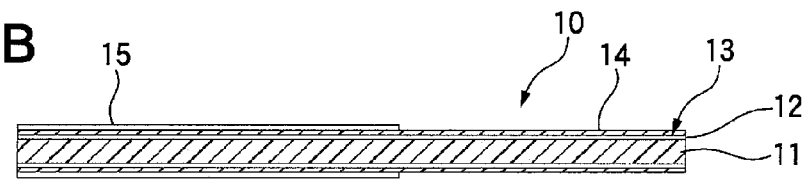
Figure 2:
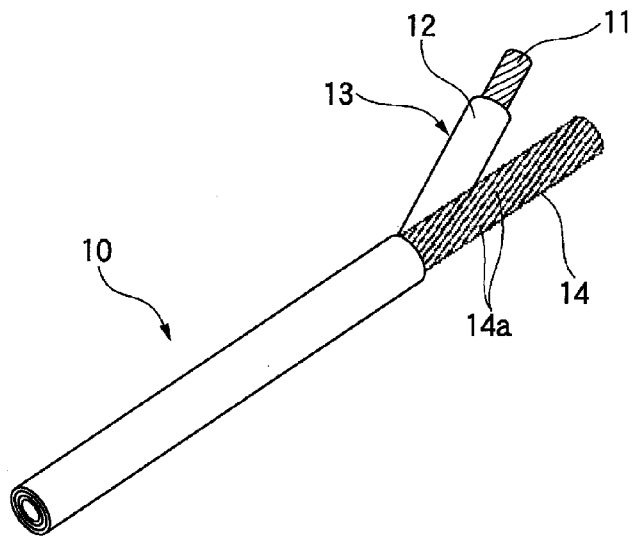
FIG. 2 is a perspective view of the end portion of the coaxial cable of which the terminal has been treated by the terminal treatment method and the terminal treatment apparatus for a coaxial cable according to the present invention

FIGS. 1A and 1B are views showing a coaxial cable of which a terminal is to be treated by a terminal treatment method and a terminal treatment apparatus of a coaxial cable according to the present invention, in which FIG. 1A is a perspective view of an end portion thereof and FIG. 1B is a sectional view of the end portion, and FIG. 2 is a perspective view of the end portion of the coaxial cable of which the terminal has been treated by the terminal treatment method and the terminal treatment apparatus of a coaxial cable according to the present invention.

As shown in FIGS. 1A and 1B, a coaxial cable 10, of which a terminal is to be treated by the terminal treatment method and the terminal treatment apparatus according to the present invention, has a structure in which a core member 13 having an inner conductor 11 covered with an insulator 12 is provided at the center thereof, an outer conductor 14 is provided around the core member 13 and a sheath 15 is also covered around the outer conductor 14.

The inner conductor 11 is, for example, an intertwined wire made of a plurality of copper wires or a single wire made of one copper wire. The insulator 12 is formed by an insulation material made of a synthetic resin. The outer conductor 14 is formed by winding a plurality of wires 14a, such as copper wires, in one direction in a spiral pattern. The sheath 15 is formed by an insulation material made of a synthetic resin.

The coaxial cable 10 is a cable in which the outer conductor 14 is intended to be used as a lead like the inner conductor 11, not as a shielding use, and is used as a wire harness wired in a vehicle, such as an automobile. As this outer conductor 14 of the coaxial cable 10, wires thicker than wires of a small diameter, such as an outer conductor for shielding, are used.

In the terminal treatment method and the terminal treatment apparatus according to the present embodiment, as shown in FIG. 2, the coaxial cable 10 is terminal-treated to become a state in which the sheath 15 on an end portion thereof has been removed and then the core member 13 having the inner conductor 11 covered with the insulator 12 have been branched from the outer conductor 14. By terminal-treating in this way, the inner conductor 11 can be exposed from an end portion of the core member 13, and then the inner conductor 11 and the outer conductor 14 from which the core member 13 has been branched can be connected to a connector or the like.

Hereinafter, the terminal treatment method and the terminal treatment apparatus according to the present embodiment will be described in detail with respect to each of steps thereof.

Figure 3:
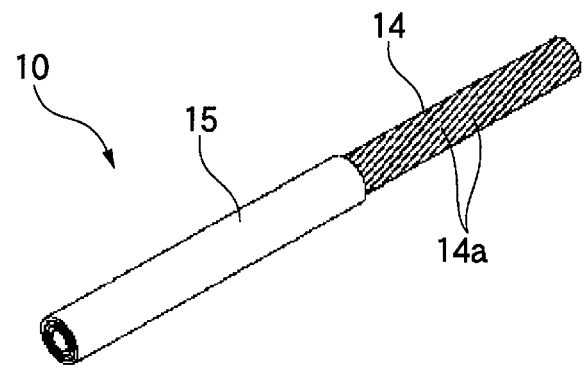
FIG. 3 is a perspective view of the end portion of the coaxial cable explaining an outer conductor exposing step.
Figure 4:
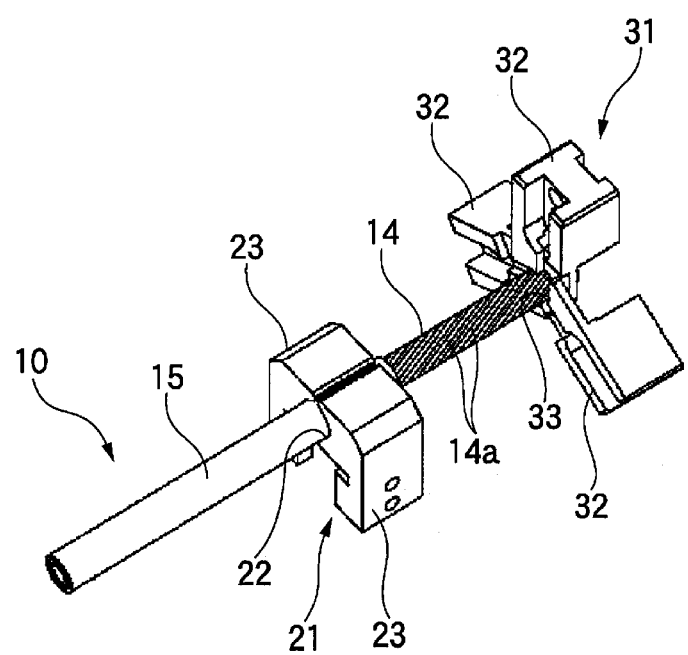
FIG. 4 is a perspective view of the end portion of the coaxial cable explaining an outer conductor releasing step.
Figure 5:
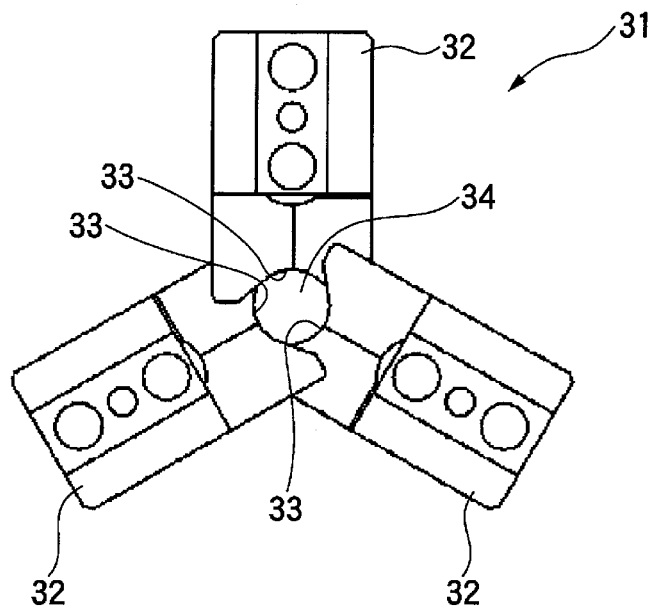
FIG. 5 is a front view showing a chuck jig.
Figure 6:
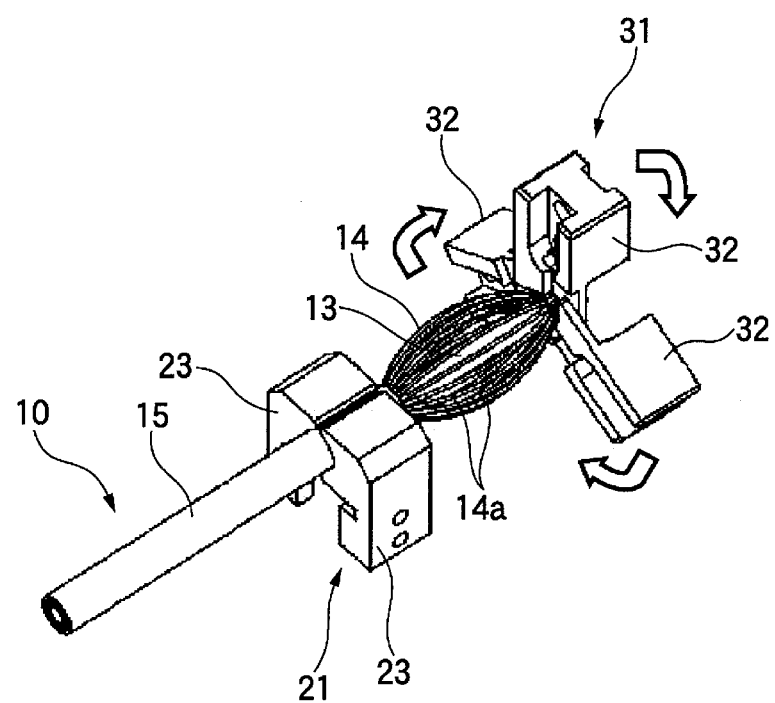
FIG. 6 is a perspective view of the end portion of the coaxial cable explaining an outer conductor releasing step.
Figure 7:
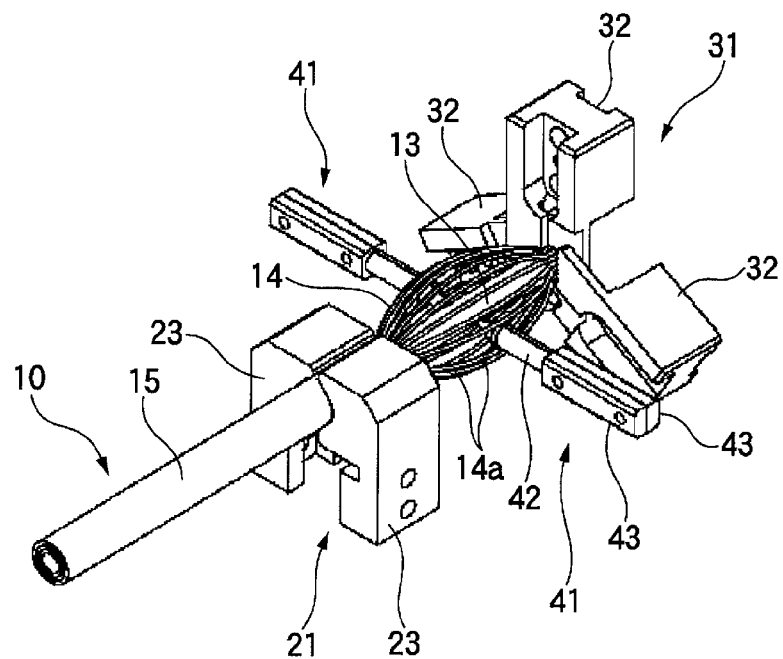
FIG. 7 is a perspective view of the end portion of the coaxial cable explaining an outer conductor splitting step.
Figure 8:
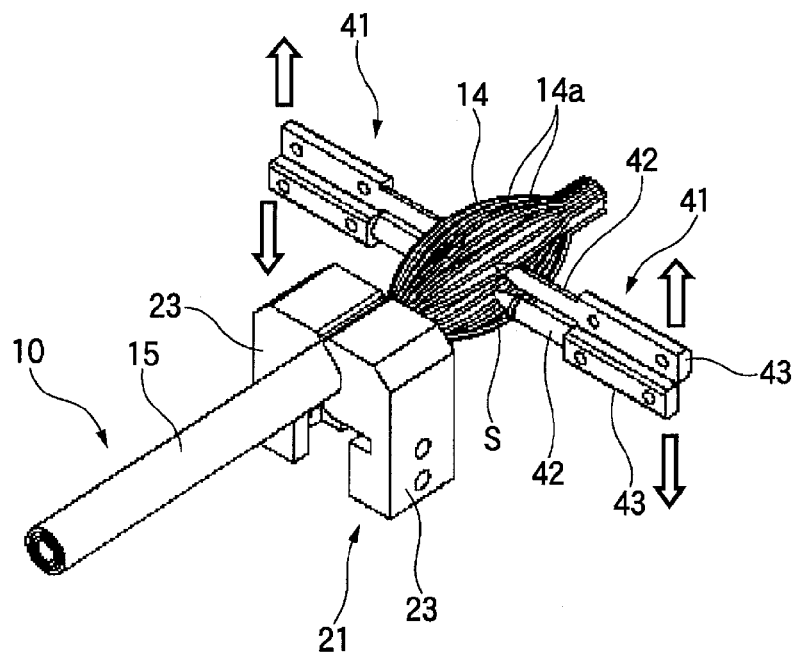
FIG. 8 is a perspective view of the end portion of the coaxial cable explaining an outer conductor splitting step.
Figure 9:
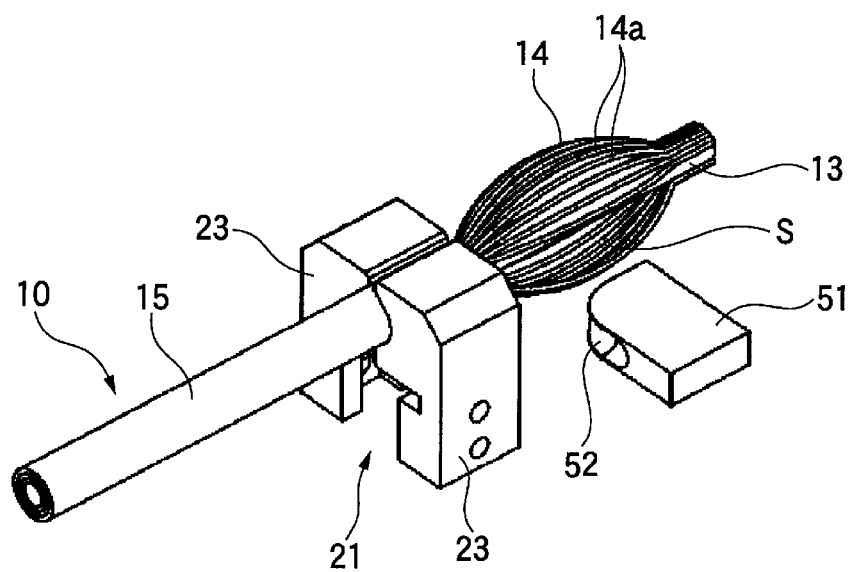
FIG. 9 is a perspective view of the end portion of the coaxial cable explaining an inner conductor extracting step.
Figure 10:
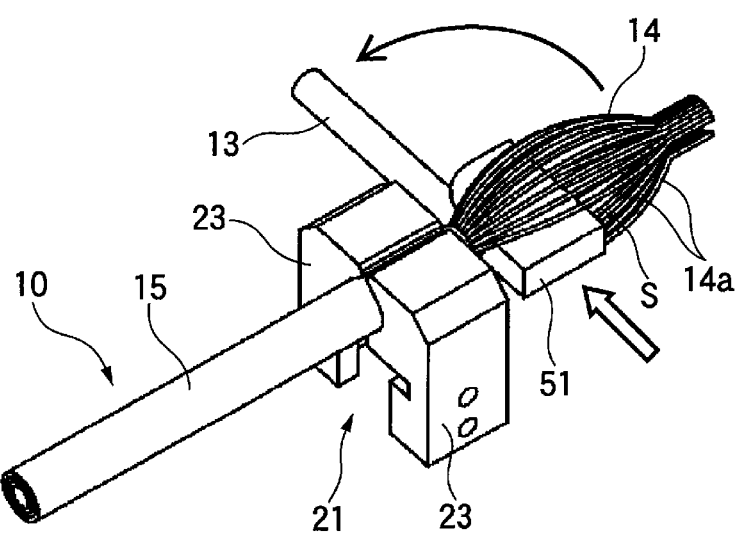
FIG. 10 is a perspective view of the end portion of the coaxial cable explaining an inner conductor extracting step.
Figure 11:
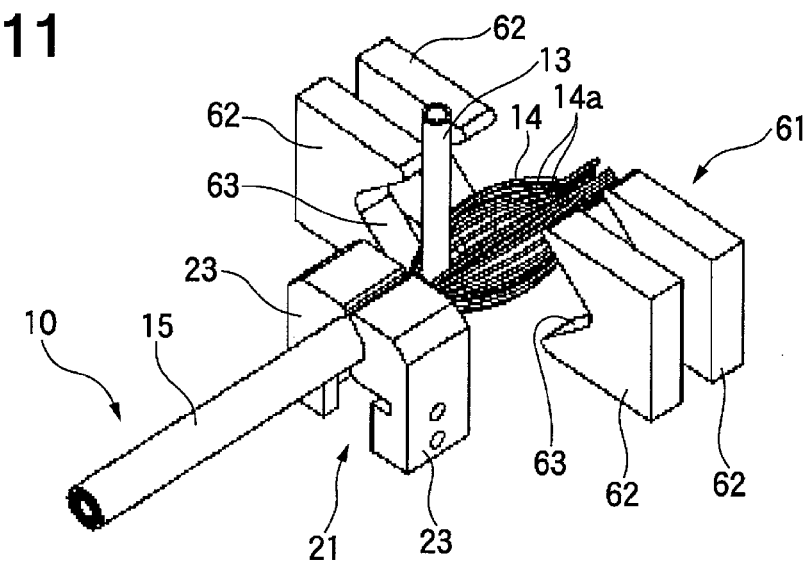
FIG. 11 is a perspective view of the end portion of the coaxial cable explaining an outer conductor converging step.
Figure 12:
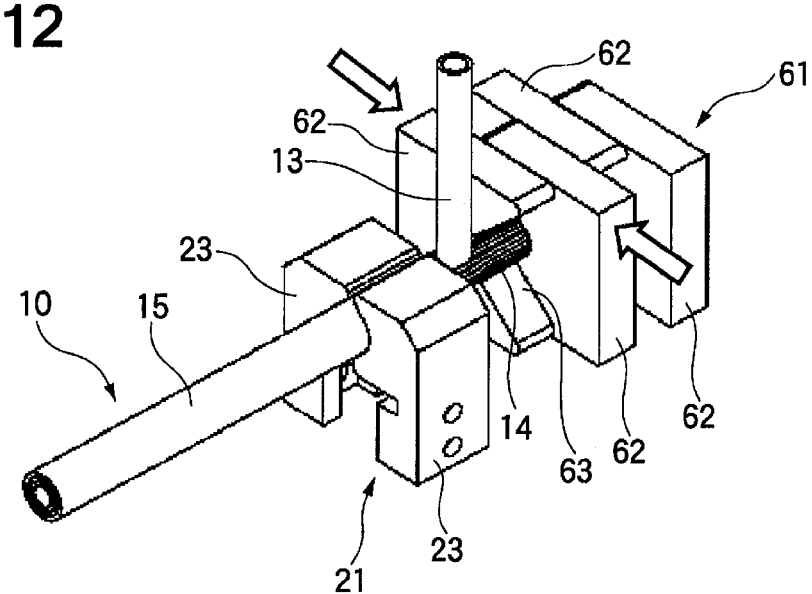
FIG. 12 is a perspective view of the end portion of the coaxial cable explaining an outer conductor converging step.
Figure 13:
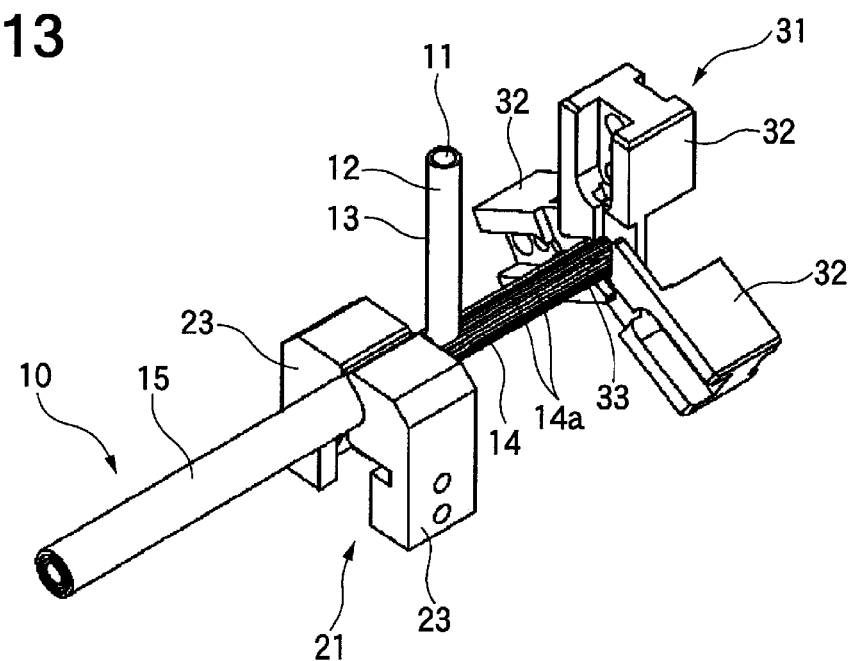
FIG. 13 is a perspective view of the end portion of the coaxial cable explaining an outer conductor intertwining step.
Figure 14:
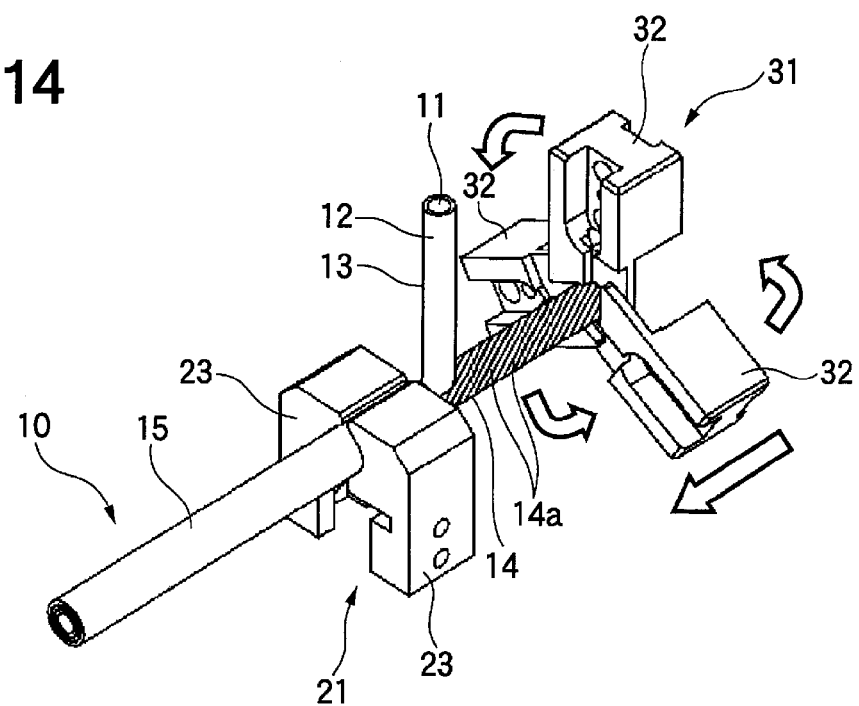
FIG. 14 is a perspective view of the end portion of the coaxial cable explaining an outer conductor intertwining step.
Figure 15:
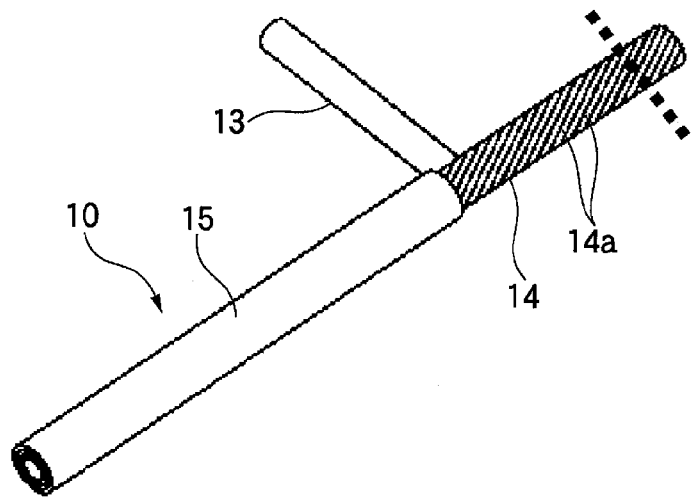
FIG. 15 is a perspective view of the end portion of the coaxial cable explaining an outer conductor terminal trimming step.

FIG. 3 is a perspective view of the end portion of the coaxial cable explaining an outer conductor exposing step, FIG. 4 is a perspective view of the end portion of the coaxial cable explaining an outer conductor releasing step, FIG. 5 is a front view showing a chuck jig, FIG. 6 is a perspective view of the end portion of the coaxial cable explaining an outer conductor releasing step, FIG. 7 is a perspective view of the end portion of the coaxial cable explaining an outer conductor splitting step, FIG. 8 is a perspective view of the end portion of the coaxial cable explaining an outer conductor splitting step, FIG. 9 is a perspective view of the end portion of the coaxial cable explaining an inner conductor extracting step, FIG. 10 is a perspective view of the end portion of the coaxial cable explaining an inner conductor extracting step, FIG. 11 is a perspective view of the end portion of the coaxial cable explaining an outer conductor converging step, FIG. 12 is a perspective view of the end portion of the coaxial cable explaining an outer conductor converging step, FIG. 13 is a perspective view of the end portion of the coaxial cable explaining an outer conductor intertwining step, FIG. 14 is a perspective view of the end portion of the coaxial cable explaining an outer conductor intertwining step, FIG. 15 is a perspective view of the end portion of the coaxial cable explaining an outer conductor terminal trimming step.

(Outer Conductor Exposing Step)

An outer conductor exposing step of exposing the outer conductor 14 is performed.

Specifically, the sheath 15 on an end portion of the coaxial cable 10 is cut by a cutter or the like. Then, the sheath 15 located more toward the end than the cut location is pulled out in a direction toward the end. As a result, as shown in FIG. 3, the outer conductor 14 is exposed by a predetermined length.

(Outer Conductor Releasing Step)

An outer conductor releasing step for unwinding and separating the exposed outer conductor 14 from the core member 13 is performed.

In the outer conductor releasing step, a gripping jig 21 and a chuck jig 31 are used as shown in FIG. 4.

The gripping jig 21 includes a pair of gripping blocks 23 each having a gripping recess 22 of a circular arc shape corresponding to an outer diameter of the sheath 15 formed therein, and grips an end portion of the sheath 15 of the coaxial cable 10 by the gripping recesses 22.

As shown in FIG. 5, the chuck jig 31 includes three chuck bodies 32 arranged in equal intervals and the chuck bodies 32 are adapted to move in a radial direction. These chuck bodies 32 each have a pressing recess 33 on the center side of the arrangement thereof, and the chuck jig 31 is provided, at the center of the arrangement of the chuck bodies 32, with an inserting hole 34 surrounded by the pressing recesses 33. The chuck jig 31 is adapted such that the chuck bodies 32 can rotate about the inserting hole 34.

In the outer conductor releasing step using the gripping jig 21 and the chuck jig 31 as described above, as show in FIG. 4, the gripping blocks 23 of the gripping jig 21 become close to each other in a state in which the end portion of the sheath 15 of the coaxial cable 10 is disposed between the gripping blocks 23. As a result, the end portion of the sheath 15 of the coaxial cable 10 is gripped by the gripping recesses 22 of the gripping blocks 23. In addition, in a state in which an end portion of the outer conductor 14 of the coaxial cable 10 is inserted in the inserting hole 34 of the chuck jig 31, the chuck bodies 32 are moved toward the center of the arrangement thereof. Therefore, the outer conductor 14 is pressed and fixed from an outer circumferential side thereof by the pressing recess 33 of each of the chuck bodies 32.

In this state, as shown in FIG. 6, the chuck bodies 32 of the chuck jig 31 are rotated in a direction opposite to a winding direction of the outer conductor 14 wound in a spiral pattern. Then, the outer conductor 14 is unwound, so that each of wires 14a is loosened and becomes a state inflated away from the core member 13.

A rotation angle θ of the chuck bodies 32 can be calculated from an axial length dimension L (mm) of the exposed outer conductor 14 and a twisting pitch P (mm/rev) of the outer conductor 14 using the following equation.

$$\theta = L/P$$

(Outer Conductor Splitting Step)

An outer conductor splitting step for splitting the outer conductor 14 unwound and separated from the core member 13 is performed.

In the outer conductor splitting step, splitting jigs 41 are used as shown in FIG. 7. The splitting jigs 41 are provided on left and right sides of the end portion of the coaxial cable 10 and are adapted to be moved relative to the coaxial cable 10 in a direction perpendicular to an axial direction thereof. Each of the splitting jigs 41 includes a pair of splitting bodies 43 having a splitting piece 42 protruding toward the coaxial cable 10, and the splitting bodies 43 are adapted to be opened relative to each other in an upward-downward direction.

In the outer conductor splitting step using the splitting jig 41 as described above, as shown in FIG. 7, the splitting jigs 41, of each of which the splitting bodies 43 has been closed relative to each other, become close to the coaxial cable 10, and then the splitting pieces 42 are inserted into the unwound and inflated outer conductor 14.

In this state, as shown in FIG. 8, the splitting bodies 43 of each of the splitting jigs 41 are opened relative to each other in an upward-downward direction and also the chuck bodies 32 of the chuck jig 31 is radially outwardly moved to release fixation of the end portion of the outer conductor 14. Then, the outer conductor 14 is split into two upper and lower groups of wires 14a, gaps S are formed between the groups of wires 14a, and thus the core member 13 is exposed in the gaps S.

(Inner Conductor Extracting Step)

When the outer conductor 14 has been split into two groups of wires 14a, an inner conductor extracting step for extracting the core member 13 having the inner conductor 11 is performed.

In the inner conductor extracting step, an extruding jig 51 is used as shown in FIG. 9. The extruding jig 51 is provided on one side of the end portion of the coaxial cable 10 and is adapted to be moved relative to the coaxial cable 10 in a direction perpendicular to the axial direction thereof. The extruding jig 51 have a holding groove 52 formed on a corner portion of a distal end thereof, which is away from the end portion of the coaxial cable 10, for holding the core member 13 of the coaxial cable 10.

In the inner conductor extracting step using the extruding jig 51 as described above, as shown in FIG. 10, the extruding jig 51 becomes close to the coaxial cable 10 and then is pressed into one gap S formed on the outer conductor 14. Then, the core member 13 is inserted and held in the holding groove 52 of the extruding jig 51 and at the same time, is laterally pressed by the extruding jig 51 to be bent at a portion located toward an end portion of the sheath 15. As a result, the core member 13 having the inner conductor 11 is extruded and extracted out of the outer conductor 14 through the other gap S.

(Outer Conductor Converging Step)

When the core member 13 having the inner conductor 11 has been extracted, an outer conductor converging step for converging the outer conductor 14 is performed.

In the outer conductor converging step, a converging jig 61 is used as shown in FIG. 11. The converging jig 61 includes converging blocks 62 arranged in pairs on each of left and right sides of the outer conductor 14 of the coaxial cable 10. The converging blocks 62 are alternately arranged to be offset in position on the left and right sides of the outer conductor 14 along the axial direction of the coaxial cable 10, and each are adapted to be moved relative to the outer conductor 14 in a direction perpendicular to the axial direction. The converging blocks 62 are each provided with a V-groove 64 on a side thereof facing the outer conductor 14.

In the outer conductor converging step using the converging jig 61 as described above, as shown in FIG. 12, the converging blocks 62 are moved toward the outer conductor 14 in a state in which the core member 13 is oriented upward. Then, the converging blocks 62 provided on the left and right sides are intersected to be overlapped on each other while holding the outer conductor 14 in the V-grooves 63. As a result, the outer conductor 14 held in the V-grooves 63 is sandwiched by the converging blocks 62 and thus is converged on an axis of the coaxial cable 10.

(Outer Conductor Intertwining Step)

An outer conductor intertwining step for intertwining the converged outer conductor 14 is performed.

In the outer conductor intertwining step, the chuck jig 31 as described above is used as shown in FIG. 13. In the outer conductor intertwining step using the chuck jig 31, as shown in FIG. 13, the chuck bodies 32 are moved toward the center of the arrangement thereof, in a state in which the end portion of the outer conductor 14 of the coaxial cable 10 is inserted in the inserting hole 34 of the chuck jig 31. As a result, the end portion of the outer conductor 14 is pressed and fixed from an outer circumferential side thereof by the pressing recess 33 of each of the chuck bodies 32.

In this state, as shown in FIG. 14, the chuck bodies 32 of the chuck jig 31 are rotated in one direction. Then, the wires 14a of the outer conductor 14 are intertwined.

Preferably, the rotation direction is the same direction as the winding direction of the outer conductor 14 which has been previously wound in a spiral pattern. Also, the rotation number of the chuck bodies 32 can be varied depending on material properties of the wires 14a of the outer conductor 14, but is preferably approximately 2 to 3 revolutions. In addition, when the wires 14a of the outer conductor 14 have been intertwined, the outer conductor 14 is shrunk in the axial direction due to intertwining. Therefore, the chuck jig 31 is adapted to be moved along the axial direction of the coaxial cable 10, and during the outer conductor intertwining step, the chuck jig 31 is moved in the axial direction corresponding to the outer conductor 14 shrunk due to intertwining.

(Outer Conductor Terminal Trimming step)

As shown in FIG. 15, an outer conductor terminal trimming step, in which the terminal portion of the outer conductor 14 fixed by the chuck jig 31 and thus having a chuck mark formed thereon is cut and removed by a cutter or the like, is performed.

By performing the foregoing steps, the core member 13, which includes the inner conductor 11, and the outer conductor 14 of the end portion of the coaxial cable 10 are branched from each other, and thus each become a state of capable of connecting to a connector or the like.

In this way, according to the terminal treatment method and the terminal treatment apparatus of the first embodiment, the end portion of the outer conductor 14 is directly gripped and moved by the chuck jig 31. Thus, slipping of the outer conductor 14 relative to the sheath 15 is reduced so that the exposed portion of the outer conductor 14 can be easily loosened, thereby clearly separating the wires 14a of the outer conductor 14 from an outer circumferential surface of the core member 13.

Namely, even when the coaxial cable 10 is intended to be used as a wire harness for a vehicle, in which the outer conductor 14 includes wires 14a of a large diameter, rather than a small diameter as in a shielding use, the outer conductor 14 is clearly separated from the core member 13 without damaging or breaking the wires 14a. Therefore, stabilization of a product shape can be achieved, thereby ensuring good electrical and mechanical properties. In addition, mechanization of terminal treatment is easy, thereby reducing the processing effort.

Also, by separating the wires 14a of the outer conductor 14 from the core member 13 as described above, extruding and extracting the core member 13 having the inner conductor 11 from the outer conductor 14, and then intertwining the outer conductor 14, the inner conductor 11 of the core member 13 and the outer conductor 14 can be clearly branched from each other to enable connection to a connector or the like.

Further, because the core member 13 having the inner conductor 11 is extruded to be branched from the outer conductor 14, a fixation position of the coaxial cable 10 and a terminal position of the outer conductor 14 are not changed. As a result, the outer conductor releasing step and the outer conductor intertwining step can be performed using the same equipments, i.e., the gripping jig 21 and the chuck jig 31, thereby achieving reduction of equipment costs.

In particular, in a case of the coaxial cable 10 having the outer conductor 10 wound on the core member 13 in a spiral pattern, the outer conductor 14 is gripped at the end portion thereof and is rotated in a direction opposite to a twisting direction thereof to be untwisted. Therefore, the outer conductor 14 can be very easily loosened to be separated from the core member 13.

Further, before the core member 13 having the inner conductor 11 is extracted, the outer conductor 14 is split into a plurality of groups of wires 14a to form the gaps S during the outer conductor splitting step, thereby achieving easy branching from the core member 13.

Further, before the outer conductor 14 is intertwined, the loosened outer conductor 14 is pressed from an outer circumference thereof to be converged, thereby achieving easy and smooth intertwining of the outer conductor 14 during the outer conductor intertwining step.

According to the present embodiment, during the outer conductor releasing step, the outer conductor 14 is rotated in a direction opposite to the winding direction of the outer conductor 14 wound in a spiral pattern to be loosened. However, in a case of a coaxial cable 10 having an outer conductor 14 attached in a longitudinal direction thereof, the end portion of the outer conductor 14 is gripped by the chuck jig 31 and then the chuck jig 31 is moved in the axial direction away from the end portion, thereby loosening the outer conductor 14.

<Second Embodiment>

Next, a terminal treatment method and a terminal treatment apparatus according to a second embodiment will be described.

In the outer conductor releasing step as described above, when the outer conductor 14 is pressed and fixed from the outer circumferential side thereof by the pressing recess 33 of each of the chuck bodies 32 of the chuck jig 31, such a load is exerted to the core member 13 having the inner conductor 11. Further, in a state in which the outer conductor 14 is fixed by the chuck jig 31, when the chuck bodies 32 are rotated to untwist the outer conductor 14, a torsion load is also exerted to the core member 13 having the inner conductor 11. If such a pressing load or a torsion load is exerted to the core member 13, there is a risk of deforming the inner conductor 11 of the core member 13.

For this reason, according to the terminal treatment method and the terminal treatment apparatus of the second embodiment, pre-treatments are performed after the outer conductor exposing step, and thus deformation of the inner conductor 11 in the subsequent outer conductor releasing step is prevented.

Hereinafter, such pre-treatments will be described.

Figure 16:
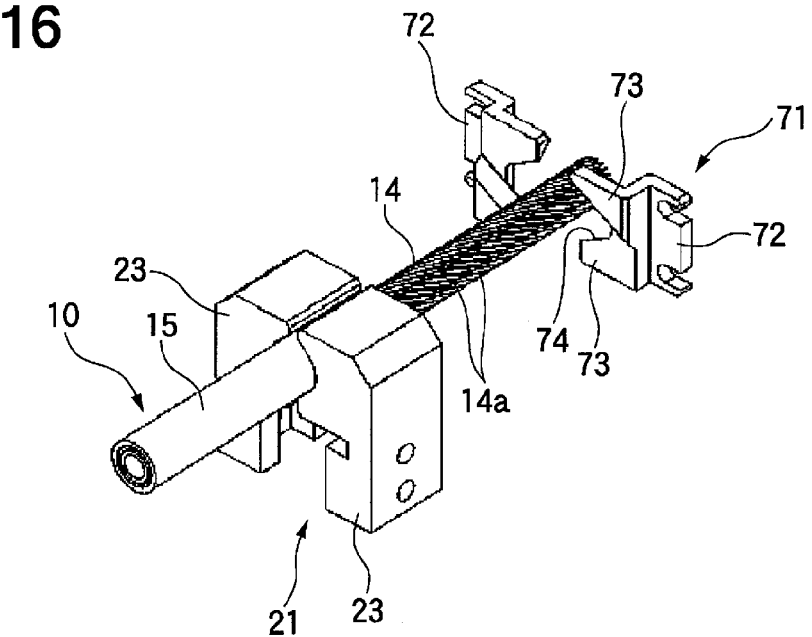
FIG. 16 is a perspective view of the end portion of the coaxial cable explaining an outer conductor terminal widening step.
Figure 17:
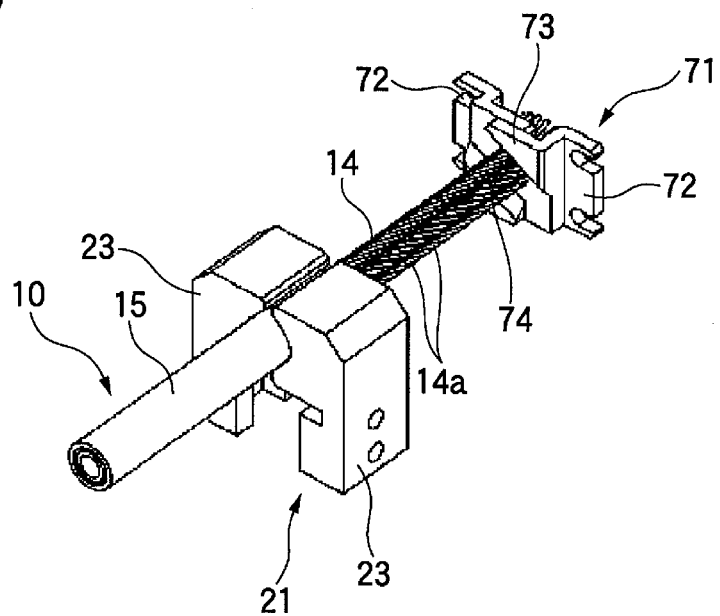
FIG. 17 is a perspective view of the end portion of the coaxial cable explaining an outer conductor terminal widening step.
Figure 18A:
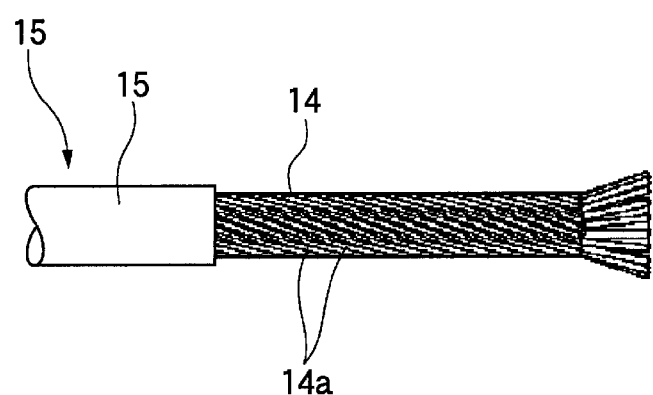
FIGS. 18A and 18B are a side view and a front view of the end portion of the coaxial cable of which the terminal portion of the outer conductor has been widened.
Figure 18B:
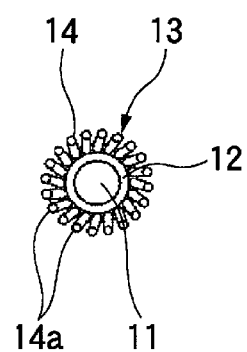
Figure 19:
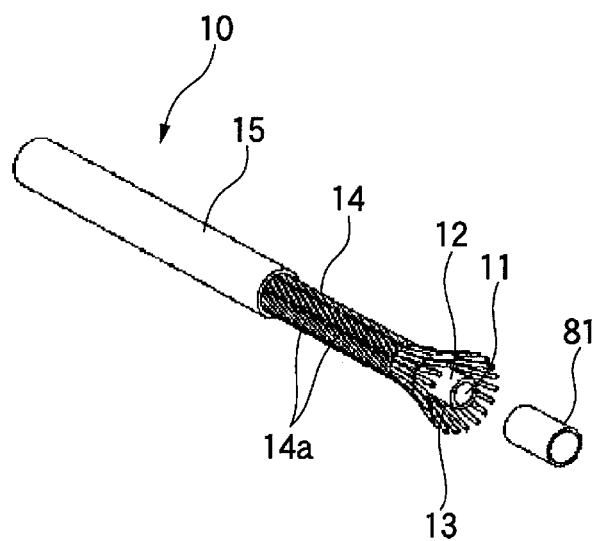
FIG. 19 is a perspective view of the end portion of the coaxial cable explaining a core mounting step.
Figure 20:
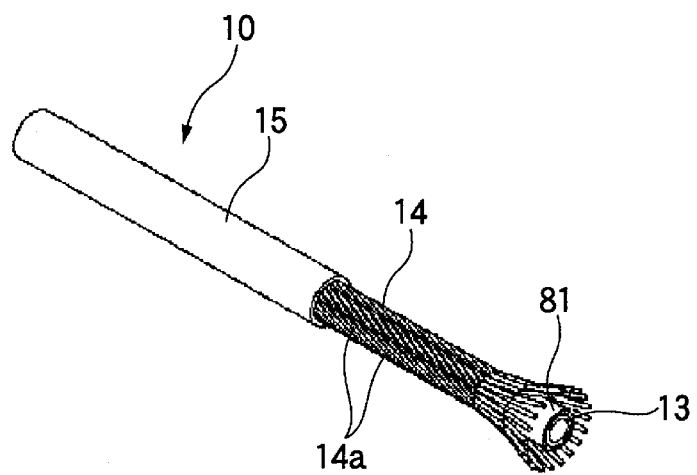
FIG. 20 is a perspective view of the end portion of the coaxial cable explaining a core mounting step.
Figure 21:
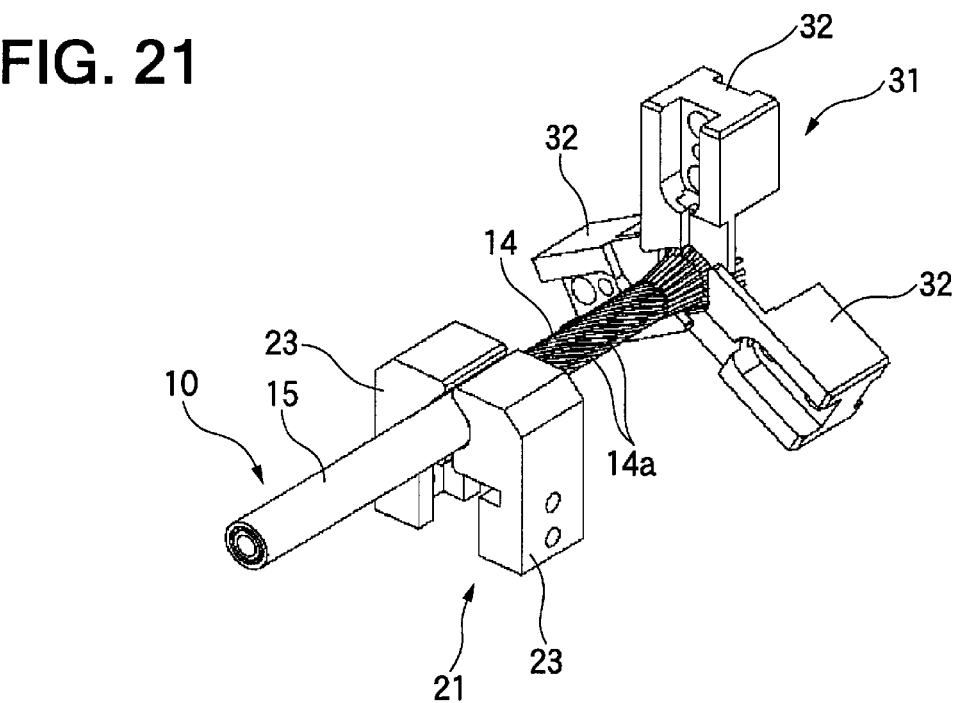
FIG. 21 is a perspective view of the end portion of the coaxial cable explaining an outer conductor releasing step.
Figure 22:
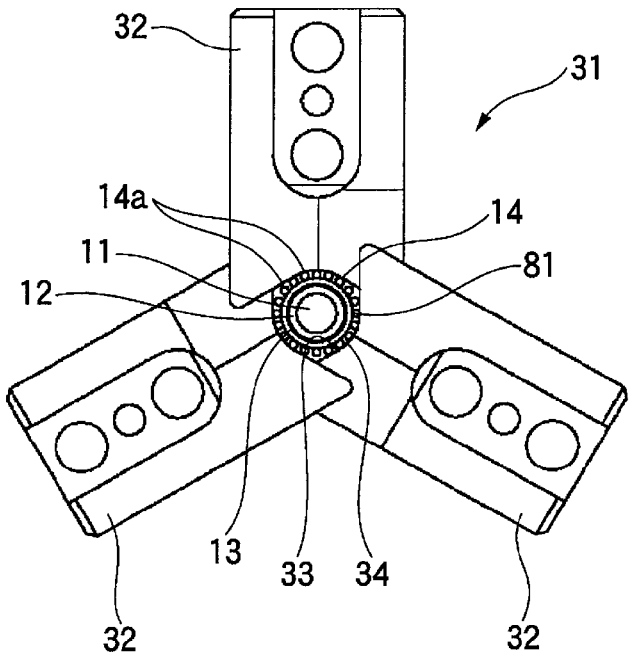
FIG. 22 is a front view of a chuck jig explaining a state of chucking the coaxial cable by the chuck jig.
Figure 23:
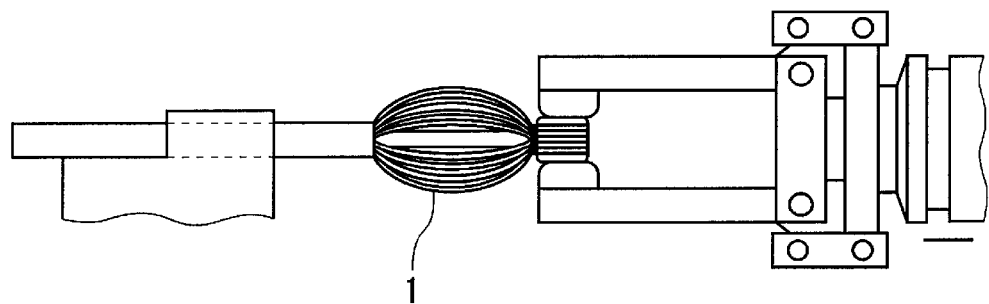
FIG. 23 is a side view of a coaxial cable explaining terminal treatment according the related art.
Figure 24:
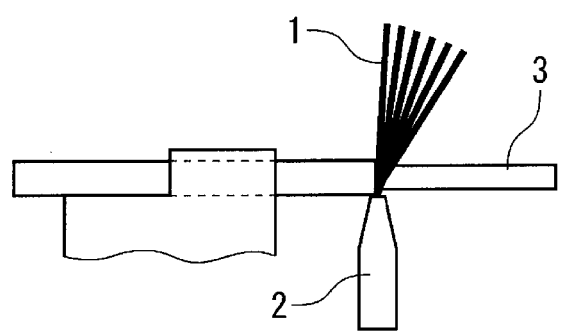
FIG. 24 is a side view and front view of a coaxial cable explaining terminal treatment according the related art.

FIG. 16 is a perspective view of the end portion of the coaxial cable explaining an outer conductor terminal widening step, FIG. 17 is a perspective view of the end portion of the coaxial cable explaining an outer conductor terminal widening step, FIGS. 18A and 18B are a side view and a front view of the end portion of the coaxial cable of which the terminal portion of the outer conductor has been widened, FIG. 19 is a perspective view of the end portion of the coaxial cable explaining a core mounting step, FIG. 20 is a perspective view of the end portion of the coaxial cable explaining a core mounting step, FIG. 21 is a perspective view of the end portion of the coaxial cable explaining an outer conductor releasing step, and FIG. 22 is a front view of a chuck jig explaining a state of chucking the coaxial cable by the chuck jig.

(Outer Conductor Terminal Widening Step)

An outer conductor terminal widening step for widening a terminal of the outer conductor 14 exposed in the outer conductor exposing step is performed.

In the outer conductor terminal widening step, the gripping jig 21 and a terminal widening jig 71 are used as shown in FIG. 16. The terminal widening jig 71 includes shaping blocks 72 arranged on the left and right sides of the outer conductor 14 of the coaxial cable 10. The shaping blocks 72 each have shaping blades 73 on upper and lower sides thereof, and the upper and lower shaping blades 73 of the left and right shaping blocks 72 are alternately offset from each other along the axial direction of the coaxial cable 10. The shaping blocks 72 are each provided with a pressing groove 74 formed on a side thereof facing the outer conductor 14 by the upper and lower shaping blades 73.

In the outer conductor terminal widening step using the terminal widening jig 71 as described above, as shown in FIG. 17, the shaping blocks 72 are moved toward the outer conductor 14 at a location of approximately 1 mm to 10 mm from the terminal of the outer conductor 14, in a state in which an end portion of the sheath 15 of the coaxial cable 10 is gripped by the gripping jig 21. Then, the shaping blocks 72 provided on the left and right sides are intersected such that the shaping blades 73 are engaged with each other, while holding the terminal of the outer conductor 14 in the pressing grooves 74. Therefore, the shaping blades 73 of the shaping blocks 72 is pressed against the outer conductor 14 held in the pressing grooves 74 from the outer circumference thereof. As a result, the outer conductor 14 around the core member 13 is compressed and bent toward the center thereof at a location pressed by the shaping blades 73. Then, as shown in FIGS. 18A and 18B, the outer conductor 14 located more toward the terminal than the pressed location is widened in an outward radial direction opposite to the pressing direction to be separated from the insulator 12 constituting the core member 13.

If the terminal of the outer conductor 14 is not sufficiently widened even when the outer conductor 14 is shaped by the terminal widening jig 71 in that way, after the shaping blocks 72 are first separated from each other and then are shifted from the compressed location of such a first time in a direction away from the terminal, the shaping blocks 72 are again pressed against the outer conductor 14. Then, the outer conductor 14 is deformed in the outward radial direction at two locations along the axial direction, thereby further widening the terminal of the outer conductor 14.

(Core Mounting Step)

When the outer conductor 14 has been widened at the terminal thereof by the outer conductor terminal widening step as shown in FIG. 19, a cylindrical core 81 formed of, for example, a hard resin or a metal is inserted and mounted onto the terminal portion of the core member 13 as shown in FIG. 20.

After performing the pre-treatments as described above, terminal treatments subsequent to the outer conductor releasing step are performed in the same manner as the first embodiment.

In this time, as shown in FIGS. 21 and 22, when the outer conductor 14 is pressed from the outer circumferential side thereof by the pressing recess 33 of each of the chuck bodies 32 of the chuck jig 31 during the outer conductor releasing step, the outer conductor 14 is sandwiched and fixed between an outer circumferential surface of the core 81 and the pressing recesses 33 of the chuck bodies 32, thereby eliminating a pressing load to the core member 13 having the inner conductor 11. Also, in a state in which the outer conductor 14 is fixed by the chuck jig 31, when the chuck bodies 32 are rotated to untwist the outer conductor 14, the core 81 together with the outer conductor 14 is rotated, thereby eliminating a torsion load to the core member 13 having the inner conductor 11.

In this way, according the terminal treatment method and the terminal treatment apparatus of the second embodiment, the cylindrical core 81 is mounted onto the core member 13 in the terminal of the outer conductor 14 so that the outer conductor 14 is sandwiched between the outer circumferential surface of the core 81 and the chuck jig 31 during the outer conductor releasing step, thereby eliminating the pressing or torsion load which would otherwise been acted to the inner conductor 11 of the core member 13. As a result, deterioration of mechanical properties, such as tensile or elongation, of the inner conductor 11 of the core member 13 can be prevented, thereby maintaining a good quality.

In addition, prior to mounting the core 81, a terminal-near portion of the outer conductor 14 is deformed by compression from the outer circumferential side thereof so that the terminal portion of the outer conductor 14 can be widened away from the core member 13, thereby achieving enhancement of workability due to easy mounting of the core 81.

The present invention is not limited to the foregoing embodiments, but appropriate changes, modifications or the like thereof can be made. In addition, material, shape, dimension, number, installation location and the like of each of the components of the foregoing embodiments are not limited but arbitrary if the present invention can be achieved.

What is claimed is:

1. A terminal treatment method for a coaxial cable which includes a core member in which an inner conductor is covered with an insulator, an outer conductor provided around the core member and formed of a plurality of wires, and a sheath covering an outer circumference of the outer conductor, the terminal treatment method for branching the core member and the outer conductor from each other at a terminal of the coaxial cable in which both the outer conductor and the inner conductor are used as leads comprising:
  exposing the outer conductor by removing the sheath on an end portion of the coaxial cable;
  separating the wires of the outer conductor from an outer circumferential surface of the core member by gripping and moving an end portion of the outer conductor to loosen the exposed portion of the outer conductor;
  extruding the core member having the inner conductor from gaps formed in the wires of the outer conductor to extract the core member from the outer conductor;
  intertwining the outer conductor by gripping and twisting the end portion of the outer conductor after the extruding step;
  mounting a cylindrical core onto the core member at a terminal of the outer conductor exposed by the outer conductor exposing step before the separating step; and
  widening the terminal of the outer conductor away from the core member by deforming a terminal-near portion of the outer conductor exposed in the outer conductor exposing step by compression from an outer circumferential side of the core conductor before the cylindrical core mounting step.

* * * * *